United States Patent

Takahari

[19]

[11] Patent Number: 6,141,537
[45] Date of Patent: Oct. 31, 2000

[54] RADIO INFORMATION BULLETIN BOARD

[75] Inventor: Kunio Takahari, Tokyo, Japan

[73] Assignee: Mitsubishi Denki Kabushiki Kaisha, Tokyo, Japan

[21] Appl. No.: 09/416,620

[22] Filed: Oct. 12, 1999

[30] Foreign Application Priority Data

Jun. 2, 1999 [JP] Japan ................... 11-154491

[51] Int. Cl.[7] ............................................ H04B 7/00
[52] U.S. Cl. .................... 455/66; 455/412; 455/517; 455/418; 455/466
[58] Field of Search ........................ 455/412, 66, 517, 455/418, 41, 524, 466; 340/905

[56] References Cited

U.S. PATENT DOCUMENTS

| | | | |
|---|---|---|---|
| 5,555,446 | 9/1996 | Jasinski | 455/54.2 |
| 5,579,535 | 11/1996 | Orlen et al. | 455/33.1 |
| 5,635,918 | 6/1997 | Tett | 340/825.52 |
| 5,719,918 | 2/1998 | Serbetciouglu et al. | 379/58 |
| 5,933,478 | 8/1999 | Ozaki et al. | 379/93.24 |
| 5,946,615 | 8/1999 | Holmes et al. | 455/412 |
| 5,953,672 | 9/1999 | Lengdell et al. | 455/517 |
| 5,987,029 | 11/1999 | Kotani et al. | 370/389 |
| 5,991,610 | 11/1999 | Ruhl et al. | 455/186.1 |

FOREIGN PATENT DOCUMENTS

| | | |
|---|---|---|
| 6131305 | 5/1994 | Japan . |
| 7334796 | 12/1995 | Japan . |
| 1131116 | 2/1999 | Japan . |

*Primary Examiner*—Fan Tsang
*Assistant Examiner*—Marceau Milord
*Attorney, Agent, or Firm*—Leydig, Voit & Mayer, Ltd.

[57] ABSTRACT

A radio information bulletin board includes an information transmitter and receiver. Receiving from a portable radio information terminal a request for transmitting stored display information, the information transmitter and receiver reads the display information from a display information storage element, and transmits by radio the display information that is read to the portable radio information terminal originating the transmission request. The portable radio information terminal acquires the display information on the radio information bulletin board in a more useful and precise manner than when taking notes of the displayed information or when memorizing the displayed information while watching the display information.

7 Claims, 3 Drawing Sheets

RADIO INFORMATION BULLETIN BOARD

BACKGROUND OF THE INVENTION

1. Field of the Invention

The present invention relates to a radio information bulletin board, and more particularly to a radio information bulletin board for storing digital information, and for providing the stored digital information in response to a request.

2. Description of Related Art

There are generally bulletin boards, information boards, advertisement boards, illustration boards and so on as means for providing information to a lot of people. In contrast with these means, there are electronic bulletin boards that apply information communications technique, for example. As one of the types of the electronic bulletin boards, there are radio electronic bulletin boards that receive information to be displayed on an electronic bulletin board by radio waves.

FIG. 6 is a block diagram showing an example of a conventional radio electronic bulletin board. In FIG. 6, the reference numeral 109 designates an information receiver for receiving display information sent from a portable radio information terminal 101 by radio waves; 102 designates a display information storage for storing display information received by the information receiver 109; 103 designates an information display unit for reading and displaying the display information stored in the display information storage 102; and 104 designates a controller for controlling the entire radio electronic bulletin board 110. The conventional radio electronic bulletin board 110 consists of the information receiver 109, display information storage 102, information display unit 103 and controller 104.

Next, the operation of the conventional radio electronic bulletin board 110 will be described. The information receiver 109 enters, by a command from the controller 104, a state in which it can receive a signal continuously or at every fixed time interval. When some change is to take place in the display contents on the information display unit 103, the portable radio information terminal 101, which provides the radio electronic bulletin board 110 with the display information, sends a display information reception request to the information receiver 109 through a channel available for the information receiver 109.

Capturing the display information reception request sent from the portable radio information terminal 101, the controller 104 commands the information receiver 109 to receive the display information. As a result, the information receiver 109 sends a response signal back to the portable radio information terminal 101, and the portable radio information terminal 101, receiving the response signal, starts to transfer the display information to the information receiver 109.

Receiving the display information sent from the portable radio information terminal 101, the information receiver 109 stores the information sequentially into the display information storage 102. Thus, the display information received by the information receiver 109 is sequentially stored in the display information storage 102. After receiving the entire display information, the information receiver 109 carries out a reception terminating processing between it and the portable radio information terminal 101.

After confirming that the entire display information is stored in the display information storage 102, the controller 104 commands the information display unit 103 to display the information stored in the display information storage 102. In response to the command, the information display unit 103 reads the display information from the display information storage 102, and displays the display information sent from the portable radio information terminal 101. After that, the information display unit 103 continues to read the display information stored in the display information storage 102 and display it until a new display information change request is supplied from the controller 104.

The foregoing conventional radio electronic bulletin board 110 has only a function to store the display information fed from the outside, and to display it. Those who watch the radio electronic bulletin board 110 and find information necessary for them in the display information take notes of the display information or memorize it to reuse it afterward.

However, in the method to reuse the display information by taking notes from the radio electronic bulletin board 110, an increasing volume of the information to be noted can present problems, in particular when the information volume to be noted is large, in that it takes a long time to make notes, it is difficult to take notes in an environment without a desk, and errors can take place in taking notes. On the other hand, in the method of memorizing the information by watching it on radio electronic bulletin board 110, problems arise because of errors in memory, forgetting, and the like.

SUMMARY OF THE INVENTION

The present invention is implemented to solve the foregoing problems. It is therefore an object of the present invention to provide a radio information bulletin board capable of acquiring the information on a radio information bulletin board in a more useful and precise manner than when reusing the information by taking notes of or memorizing the information on the radio information bulletin board. This is implemented by using such a configuration that enables external radio communications equipment to acquire the information stored in the radio information bulletin board by radio waves.

According to an aspect of the present invention, there is provided a radio information bulletin board comprising: information storing means for storing information; and stored information transmitting means for reading, when receiving a stored information transmission request from external radio communications equipment, stored information from the information storing means, and for transmitting by radio waves the stored information that is read to the external radio communications equipment originating the transmission request.

Here, the radio information bulletin board may further comprise information receiving means for receiving information transmitted from the external radio communications equipment, wherein the information storing means may store the information received.

The radio information bulletin board may further comprise information receiving means for receiving information transmitted from an external information processing unit through a cable, wherein the information storing means may store the information received.

The radio information bulletin board may further comprise stored information display means for displaying the stored information by reading it from the information storing means.

The information storing means may comprise a plurality of information storages corresponding to different radio channels, respectively, the radio information bulletin board may further comprise stored information selecting means for selecting, when the external radio communications equipment transmits a transmission request for stored information in one of the plurality of information storages through the channel corresponding to the one of the plurality of information storages, the information storage corresponding to the channel associated with the transmission request from the plurality of the information storages, and the stored information transmitting means may read the stored information from the information storage selected, and transmit it to the external radio communications equipment originating the transmission request.

The information storing means may comprise a plurality of information storages; the radio information bulletin board may further comprise stored information title display means for displaying a list of a plurality of stored information titles corresponding to the plurality of information storages, respectively, stored information title selecting means for selecting one of the plurality of stored information titles displayed in the list, and stored information selecting means for selecting from the plurality of information storages the information storage corresponding to the stored information title selected, wherein the stored information transmitting means may read the stored information from the information storage selected, and transmit the stored information to the external radio communications equipment originating the transmission request.

DETAILED DESCRIPTION OF THE PREFERRED EMBODIMENTS

The embodiments in accordance with the present invention will now be described with reference to the accompanying drawings.

EMBODIMENT 1

Figure 1:
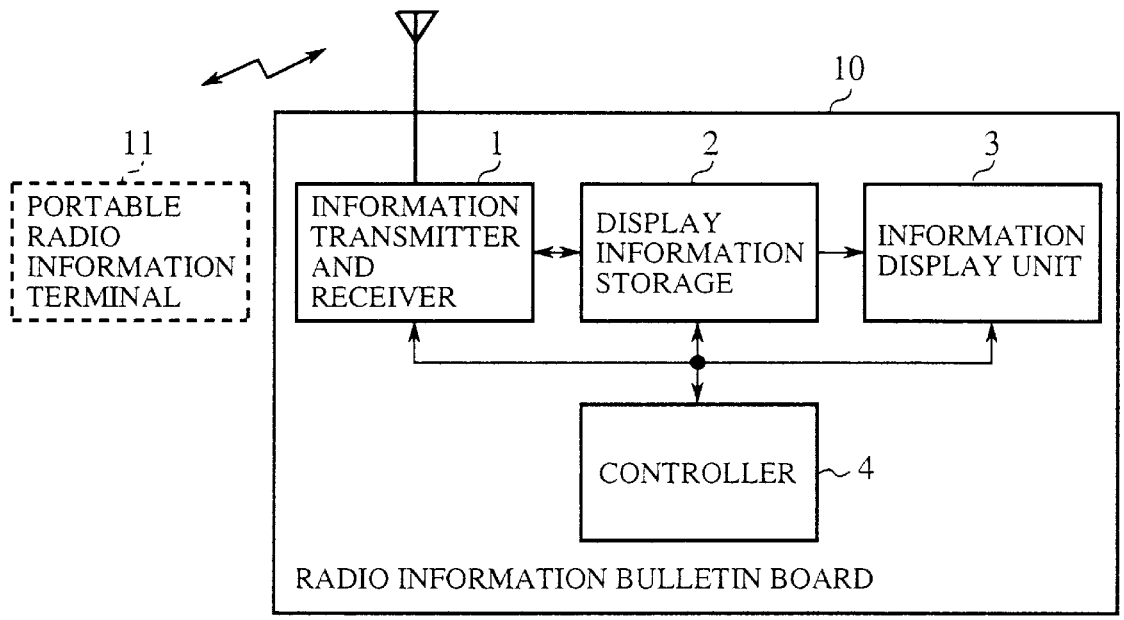
FIG. 1 is a block diagram showing an embodiment 1 of a radio electronic bulletin board in accordance with the present invention.

FIG. 1 is a block diagram showing an embodiment 1 of a radio electronic bulletin board in accordance with the present invention. In FIG. 1, a radio information bulletin board 10 comprises an information transmitter and receiver 1, a display information storage 2, an information display unit 3 and a controller 4.

The information transmitter and receiver 1, after receiving display information sent from a portable radio information terminal 11 by radio waves, transmits the display information stored in the display information storage 2 to the portable radio information terminal 11 in response to a transmission request. The display information storage 2 stores the display information received by the information transmitter and receiver 1. The information display unit 3 reads the display information stored in the display information storage 2 and displays it. The controller 4 controls the radio information bulletin board 10 in its entirety.

Figure 6:
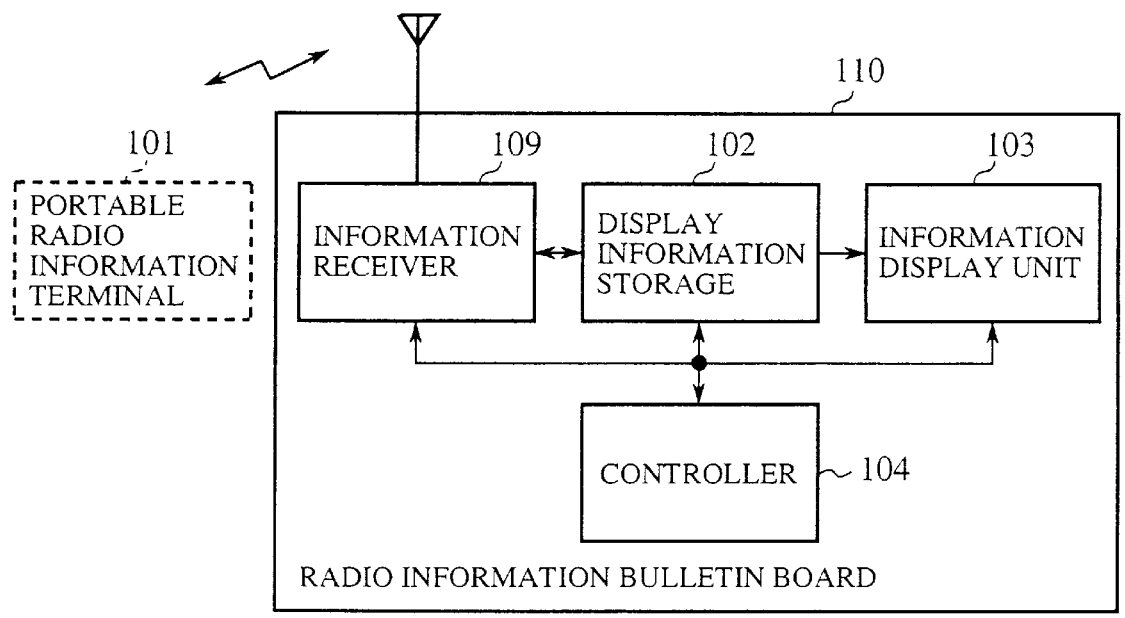
FIG. 6 is a block diagram showing a conventional radio electronic bulletin board.

Next, the operation of the present embodiment of the radio information bulletin board 10 as shown in FIG. 1 will be described. The procedure of the present embodiment of the radio information bulletin board is the same as that of the conventional radio electronic bulletin board as shown in FIG. 6 from receiving the information sent from the portable radio information terminal 11 to displaying the information. It will now be described in more detail.

The information transmitter and receiver 1 enters, in response to a command from the controller 4, a state in which it can receive a signal continually or at each of fixed time intervals. When some change takes place in the contents to be displayed on the information display unit 3, the portable radio information terminal 11, which provides the display information to the radio information bulletin board 10, sends to the information transmitter and receiver 1 a display information reception request through a channel available for the information transmitter and receiver 1.

Capturing the display information reception request sent from the portable radio information terminal 11, the controller 4 commands the information transmitter and receiver 1 to receive the display information. As a result, the information transmitter and receiver 1 sends a response signal back to the portable radio information terminal 11. Receiving the response signal from the information transmitter and receiver 1, the portable radio information terminal 11 starts to transfer the display information to the information transmitter and receiver 1.

The information transmitter and receiver 1 receives the display information transferred from the portable radio information terminal 11, and stores it in the display information storage 2. Thus, the display information received by the information transmitter and receiver 1 is sequentially stored in the display information storage 2, and the information transmitter and receiver 1, after receiving the entire display information, carries out the reception terminating processing between it and the portable radio information terminal 11.

The controller 4, after confirming that the entire display information is stored in the display information storage 2, commands the information display unit 3 to display the information stored in the display information storage 2. Thus, the information display unit 3 reads the display information from the display information storage 2, and displays the display information transferred from the portable radio information terminal 11. After that, the information display unit 3 continues to read the display information from the display information storage 2 and display the display information until a new display information change request is supplied from the controller 4.

Next, transmission of the display information to the portable radio information terminal 11 will be described, assuming that the display information is stored in the display information storage 2. The information transmitter and receiver 1 enters, in response to the command from the controller 4, the state in which it can receive the signal continuously or at each of fixed time intervals. To capture the display information stored in the display information storage 2, the portable radio information terminal 11 sends a display information transmission request to the information transmitter and receiver 1.

Capturing the display information transmission request sent from the portable radio information terminal 11, the controller 4 commands the information transmitter and receiver 1 to transmit the display information stored in the display information storage 2. Being supplied with the display information transmission command from the controller 4, the information transmitter and receiver 1 sends a response signal back to the portable radio information terminal 11, and starts to transfer the display information.

The information transmitter and receiver 1 sequentially reads the display information from the display information storage 2, and transfers it to the portable radio information terminal 11. Thus, the display information to be transmitted by the information transmitter and receiver 1 is sequentially read from the display information storage 2, and transferred to the portable radio information terminal 11. After transmitting the entire display information, the information transmitter and receiver 1 carries out transmission terminating processing between it and the portable radio information terminal 11.

After that, the portable radio information terminal 11 that receives the display information can immediately display, if it comprises an information display unit, the received display information on the information display unit. If the portable radio information terminal 11 has no information display unit, the display information can be displayed by transferring the display information from the portable radio information terminal 11 to an information processing unit, such as a personal computer, that includes an information display unit.

Thus, the present embodiment is configured such that it reads the display information from the display information storage 2 when the information transmitter and receiver 1 receives from the portable radio information terminal 11 a transmission request for the stored display information, and transmits by radio waves the display information to the portable radio information terminal 11 originating the transmission request. This makes it possible for the portable radio information terminal 11 to acquire by radio waves the display information stored in the display information storage 2 of the radio information bulletin board 10.

Accordingly, the display information on the radio information bulletin board 10 can be captured in a more useful and accurate manner than when taking notes of the display information or memorizing it to use the information.

EMBODIMENT 2

Figure 2:
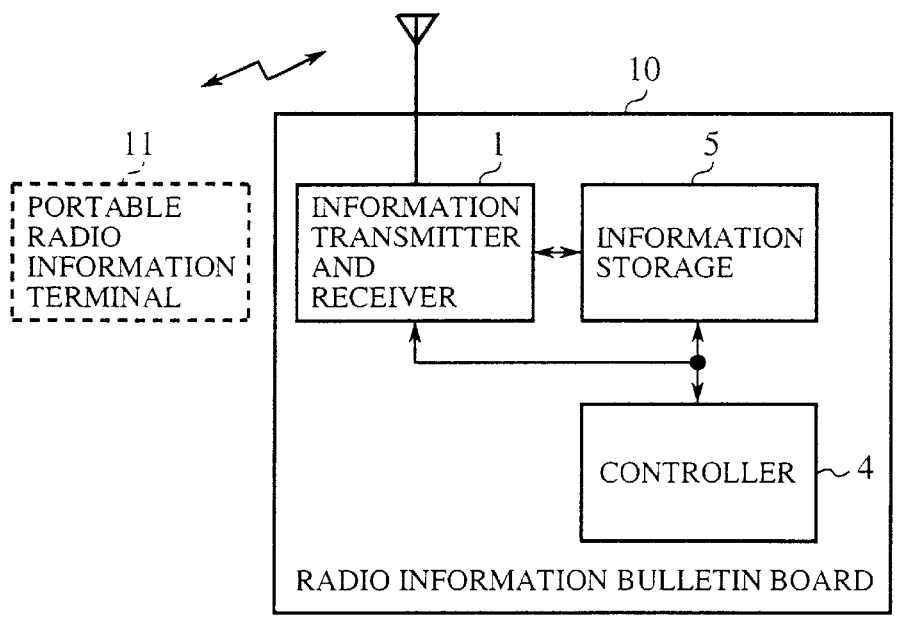
FIG. 2 is a block diagram showing an embodiment 2 of the radio electronic bulletin board in accordance with the present invention.

FIG. 2 is a block diagram showing a configuration of an embodiment 2 of the radio information bulletin board in accordance with the present invention. In FIG. 2, the same reference numerals designate the same or like portions as those of FIG. 1, and the reference numeral 5 designates an information storage that has the same structure as the display information storage 2 of FIG. 1 except for the path to information display unit 3. The radio information bulletin board 10 as shown in FIG. 2 has nearly the same configuration as the radio information bulletin board 10 as shown in FIG. 1 except for the information display unit 3.

The present embodiment 2 of the radio information bulletin board 10 is provided with information to be stored in the information storage 5 from the portable radio information terminal 11 by radio waves. The information transmitter and receiver 1 enters, in response to the command from the controller 4, a state in which it can receive the signal continuously or at each of fixed time intervals. To change the information stored in the information storage 5, the portable radio information terminal 11 sends to the information transmitter and receiver 1 a stored information reception request through a channel available for the information transmitter and receiver 1.

Capturing the stored information reception request transmitted from the portable radio information terminal 11, the controller 4 commands the information transmitter and receiver 1 to receive the information to be stored. As a result, the information transmitter and receiver 1 sends a response signal back to the portable radio information terminal 11. Receiving the response signal from the information transmitter and receiver 1, the portable radio information terminal 11 starts to transfer the information to be stored to the information transmitter and receiver 1.

The information to be stored the information transmitter and receiver 1 received is sequentially stored in the information storage 5. Thus, the information received by the information transmitter and receiver 1 is sequentially stored in the information storage 5. Receiving the entire information to be stored, the information transmitter and receiver 1 carries out a reception terminating processing between it and the portable radio information terminal 11.

The information stored in the information storage 5 is transferred to the portable radio information terminal 11 by radio waves. When transferring the information stored in the information storage 5 to the portable radio information terminal 11, the portable radio information terminal 11 uses a channel available to the information transmitter and receiver 1, and sends to the information transmitter and receiver 1 the stored information transmission request, first. Capturing the transmission request from the portable radio information terminal 11, the controller 4 commands the information transmitter and receiver 1 to transmit the information stored in the information storage 5.

Thus being supplied with the stored information transmission command from the controller 4, the information transmitter and receiver 1 sends a response signal back to the portable radio information terminal 11, and starts the transmission of the information stored. The information transmitter and receiver 1 sequentially reads the stored information from the information storage 5, and transmits it to the portable radio information terminal 11. Thus, the stored information that the information transmitter and receiver 1 transmits is sequentially read out of the information storage 5, and is transferred to the portable radio information terminal 11. Upon completing transmission of the entire stored information, the information transmitter and receiver 1 carries out a transmission terminating processing between it and the portable radio information terminal 11.

After that, the portable radio information terminal 11 that receives the stored information can immediately display, when it possesses an information display unit, the information received on the information display unit. If the portable radio information terminal 11 has no information display unit, the stored information can be displayed by transferring it from the portable radio information terminal 11 to an information processing unit, such as a personal computer, including an information display unit.

Thus, the present embodiment 2 is configured such that when the information transmitter and receiver 1 receives from the portable radio information terminal 11 the transmission request for the stored information, it reads the stored information from the information storage 5, and transmits the stored information to the portable radio information terminal 11 originating the transmission request. This enables portable radio information terminal 11 to acquire the information stored in the information storage 5 in the radio information bulletin board 10 by radio waves.

Accordingly, the display information on the radio information bulletin board 10 can be captured in a more useful and accurate manner than in the case of taking notes of the display information or memorizing it to use the information.

EMBODIMENT 3

Figure 3:
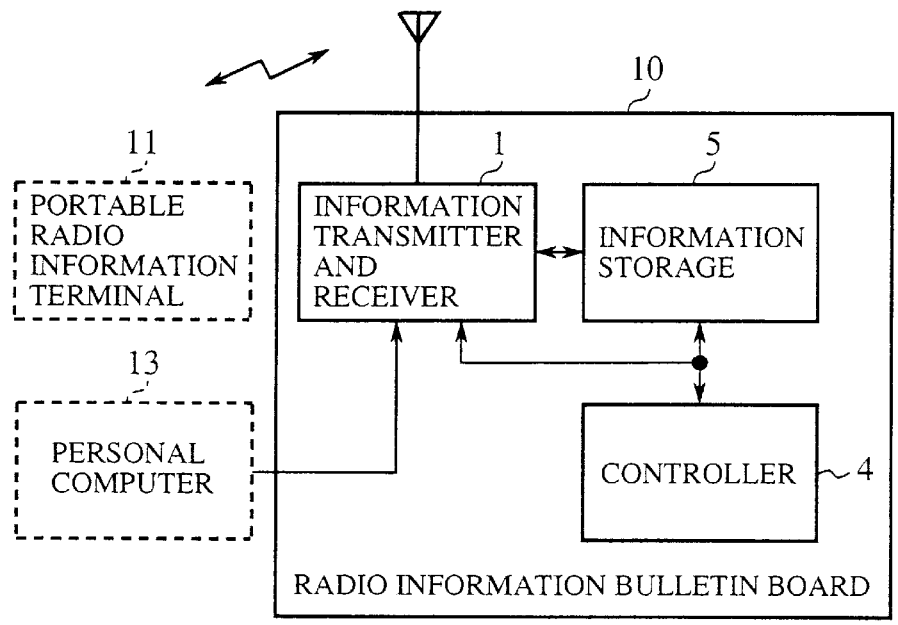
FIG. 3 is a block diagram showing an embodiment 3 of the radio electronic bulletin board in accordance with the present invention.

FIG. 3 is a block diagram showing a configuration of an embodiment 3 of a radio information bulletin board in accordance with the present invention. In FIG. 3, the same reference numerals designate the same or like portions as those of FIG. 2, and the reference numeral 13 designates an information processing unit like a personal computer connected to the radio information bulletin board 10 through a cable. In FIG. 3, the information to be stored in the information storage 5 of the radio information bulletin board 10 is supplied from the information processing unit 13 like a personal computer connected through a cable, instead from the portable radio information terminal 11.

The radio information bulletin board 10 as shown in FIG. 3 is supplied with the information to be stored in the information storage 5 through the cable from the information processing unit 13. The information transmitter and receiver 1 enters, in response to the command from the controller 4, the state in which it can receive the signal continuously or at each of fixed time intervals. To change the information stored in the information storage 5, the information processing unit 13 connected to the radio information bulletin board 10 sends to the information transmitter and receiver 1 a stored information reception request, first.

Capturing the reception request from the information processing unit 13, the controller 4 commands the information transmitter and receiver 1 to receive the information to be stored. As a result, the information transmitter and receiver 1 sends a response signal back to the information processing unit 13. Receiving the response signal from the information transmitter and receiver 1, the information processing unit 13 starts to transfer to the information transmitter and receiver 1 the information to be stored. The information received is sequentially stored in the information storage 5. Thus, the information to be stored that the information transmitter and receiver 1 receives is sequentially stored in the information storage 5. Receiving the entire information to be stored, the information transmitter and receiver 1 carries out the reception terminating processing between it and the information processing unit 13.

The procedure of transferring the information stored in the information storage 5 to the portable radio information terminal 11 originating the transmission request is the same as those of the foregoing embodiments 1 and 2.

As described above, in the present embodiment, the information transmitter and receiver 1 receives the information to be stored from the external information processing unit 13 through the cable, thereby enabling the information storage 5 to store the received information.

EMBODIMENT 4

Figure 4:
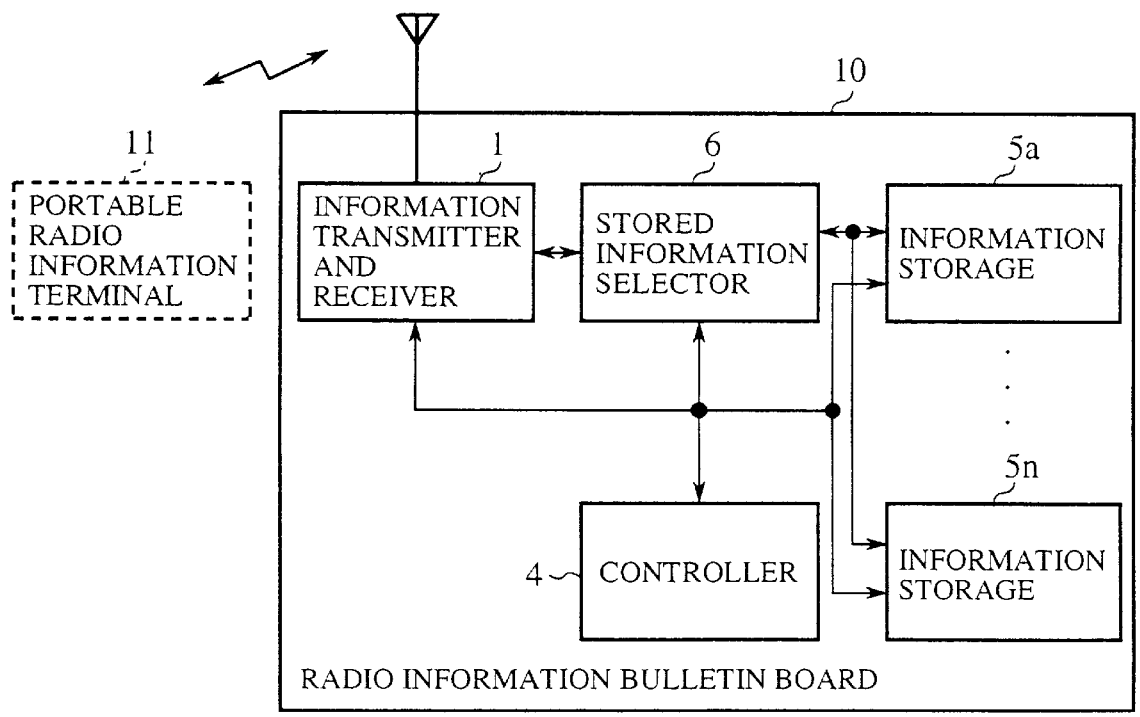
FIG. 4 is a block diagram showing an embodiment 4 of the radio electronic bulletin board in accordance with the present invention.

FIG. 4 is a block diagram showing a configuration of an embodiment 4 of the radio information bulletin board in accordance with the present invention. In FIG. 4, the same reference numerals designate the same or like portions as those of FIG. 2; $5a-5n$ designate a set of a plurality of information storage elements each of which is the same as the information storage element 5 of the radio information bulletin board 10 as shown in FIG. 2; and the reference numeral 6 designates a stored information selector for selecting one of the plurality of information storage elements $5a-5n$, and for carrying out the input and output of the stored information.

The radio information bulletin board 10 with the configuration as shown in FIG. 4 selects the information stored in one of the plurality of information storage elements $5a-5n$ through one of different channels of radio waves, and provides the information selected to the portable radio information terminal 11. The information transmitter and receiver 1 can receive, in response to the command of the controller 4, the signal continuously or at each of fixed time intervals, and varies its receiving channel at every fixed time interval from information storage elements $5a$ to $5n$.

To change the information stored in one of the information storage elements $5a-5n$, in the information storage element $5a$, for example, the portable radio information terminal 11, using the channel corresponding to the information storage element $5a$, sends to the information transmitter and receiver 1 a stored information reception request, first. Capturing the stored information reception request sent from the portable radio information terminal 11, the controller 4 commands the information transmitter and receiver 1 to receive the information to be stored. As a result, the information transmitter and receiver 1 sends a response signal back to the portable radio information terminal 11. The portable radio information terminal 11, receiving the response signal from the information transmitter and receiver 1, starts to transfer the information to be stored to the information transmitter and receiver 1.

The information to be stored that the information transmitter and receiver 1 receives from the portable radio information terminal 11 is sequentially stored into the information storage $5a$, for example, through the stored information selector 6. Receiving the entire information to be stored, the information transmitter and receiver 1 carries out the reception terminating processing between it and the portable radio information terminal 11.

The information stored in the information storage elements $5a-5n$ is transferred to the portable radio information terminal 11 by radio waves. When making a transfer request for the information stored in one of the information storage elements $5a-5n$, in the information storage element $5a$, for example, the portable radio information terminal 11, using the channel corresponding to the information storage element $5a$ selected from a plurality of channels available for the information transmitter and receiver 1, sends to the information transmitter and receiver 1 a transmission request of the stored information.

Capturing the stored information transmission request sent from the portable radio information terminal 11, the controller 4 commands the information transmitter and receiver 1 to transmit the information stored in the information storage element $5a$, for example. As a result, being supplied with the stored information transmission command from the controller 4, the information transmitter and receiver 1 sends the response signal back to the portable radio information terminal 11, and starts to transfer the stored information.

The information transmitter and receiver 1 sequentially reads, through the stored information selector 6, the information stored in the information storage $5a$, for example, and transfers it to the portable radio information terminal 11. Thus, the stored information the information that transmitter and receiver 1 transmits is sequentially read from the information storage $5a$ through the stored information selector 6 to be transferred to the portable radio information terminal 11. Having transmitted the entire stored information, the information transmitter and receiver 1 carries out the transmission terminating processing between it and the portable radio information terminal 11.

Thus, the present embodiment 4 is configured such that the plurality of information storage elements 5a–5n are linked with different radio channels, respectively, so that when the portable radio information terminal 11, using the channel corresponding to the information storage 5a, for example, makes a transmission request for the information stored in one of the plurality of information storage elements 5a–5n, the information storage 5a, for example, the information transmitter and receiver 1, receiving the transmission request, selects, through the stored information selector 6, the information storage element 5a corresponding to the channel of the transmission request, from the plurality of information storage elements 5a–5n in accordance with the channel of the transmission request, reads the information stored in the information storage 5a, and transmits it to the portable radio information terminal 11 originating the transmission request. This makes it possible to select from the plurality of information storage elements 5a–5n the specified information storage element 5a, for example, corresponding to the transmission request sent from the portable radio information terminal 11, to read the information stored in the information storage element 5a, and to transmit, using radio waves, the information to the portable radio information terminal 11 originating the transmission request.

EMBODIMENT 5

Figure 5:
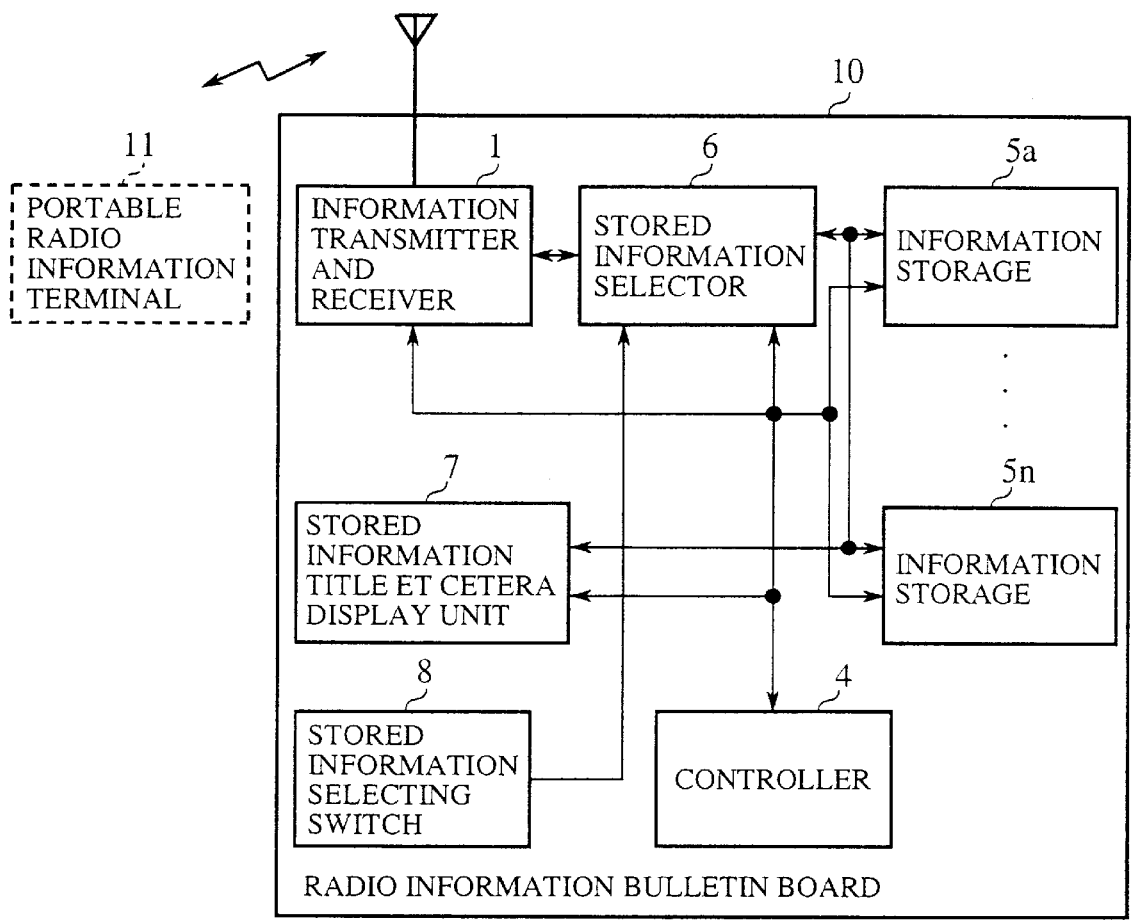
FIG. 5 is a block diagram showing an embodiment 5 of the radio electronic bulletin board in accordance with the present invention.

FIG. 5 is a block diagram showing a configuration of an embodiment 5 of the radio information bulletin board in accordance with the present invention. Although in the foregoing embodiment 4 as shown in FIG. 4, the specific information storage element 5a is selected from the plurality of information storage elements 5a–5n of the radio information bulletin board 10 using the radio channel, the selection is carried out using a switch in the present embodiment. In FIG. 5, the same reference numerals designate the same or like portions as those of FIG. 4; the reference numeral 7 designates a stored information title et cetera display unit for displaying in a list a plurality of stored information titles or the like corresponding to the plurality of information storage elements 5a–5n; and 8 designates a stored information selecting switch for selecting one of the plurality of stored information titles displayed in the list.

To change the information stored in one of the information storage elements 5a–5n, one of the plurality of stored information titles is selected from the displayed list using a cursor moved up and down by the stored information selecting switch 8 consisting of an up/down switch, for example. Subsequently, the portable radio information terminal 11 sends a stored information reception request to the information transmitter and receiver 1.

Capturing the stored information reception request from the portable radio information terminal 11, the controller 4 commands the information transmitter and receiver 1 to receive the information to be stored. As a result, the information transmitter and receiver 1 sends a response signal back to the portable radio information terminal 11. Receiving the response signal from the information transmitter and receiver 1, the portable radio information terminal 11 starts to transfer the information to be stored by the information transmitter and receiver 1.

The information to be stored sent from the portable radio information terminal 11 and received by the information transmitter and receiver 1 is sequentially stored via the stored information selector 6 in the information storage element 5a, for example, which corresponds to the stored information title selected. After the information transmitter and receiver 1 receives the entire information to be stored, the controller 4 changes the title displayed on the stored information title et cetera display 7 to the title in the information received, and carries out the reception terminating processing between it and the portable radio information terminal 11.

To make a transmission request for the information stored in one of the information storage 5a–5n, the portable radio information terminal 11, using a channel available for the information receiver 1, sends to the information transmitter and receiver 1 a stored information transmission request.

When one of the plurality of stored information titles is selected from the displayed list using the cursor moved up and down by the stored information selecting switch 8, the stored information selector 6 selects one of the information storage elements, the information storage element 5a, for example, corresponding to the stored information title selected.

The information transmitter and receiver 1 sequentially reads the information stored in the information storage selected, 5a, for example, through the stored information selector 6, and transfers it to the portable radio information terminal 11. Thus, the stored information to be transmitted from the information transmitter and receiver 1 is sequentially read from the information storage 5a via the stored information selector 6, and is transmitted to the portable radio information terminal 11. After transmitting the entire stored information, the information transmitter and receiver 1 carries out the transmission terminating processing between it and the portable radio information terminal 11.

Thus, the present embodiment is configured such that the stored information title et cetera display 7 displays in a list the plurality of stored information titles corresponding to the plurality of information storage elements 5a–5n, respectively, to select one of the stored information titles from the displayed list using the stored information selecting switch 8, and such that the stored information selector 6 selects the information storage element 5a, for example, corresponding to the stored information title selected from the plurality of information storage elements 5a–5n in accordance with the stored information title selected, and then the information transmitter and receiver 1 reads from the information storage element 5a selected the stored information, and transmits it to the portable radio information terminal 11 originating the transmission request by radio waves. This makes it possible to select one of the plurality of stored information titles from the list displayed, and to select from the plurality of information storage elements 5a–5n the information storage element 5a, for example, corresponding to the stored information title in accordance with the stored information title selected, and then to read the stored information from the information storage 5a selected, and to transmit it to the portable radio information terminal 11 originating the transmission request by radio.

Incidentally, the foregoing embodiments can adopt, as the information to be stored in the radio information bulletin board 10, languages such as text style, HTML, JAVA etc., which are independent of the devices. In this case, the utilization of the radio information bulletin board 10 by the portable radio information terminal 11 can be implemented.

Furthermore, it is obvious in the foregoing embodiments that a user of the radio information bulletin board 10 can utilize a notebook personal computer or a terminal dedicated to the radio information bulletin board 10 in place of the portable radio information terminal 11.

Moreover, the radio information bulletin board 10 can be configured with a means for keep tracking of the information storage capacity of the portable radio information terminal 11 or the like for receiving the information, and for varying the information volume in accordance with the capacity, or with a means for storing digital voice information. Besides, the radio information bulletin board 10 can be configured with a billing means, or with a means including an artificial retina LSI for turning on and off the power in response to the proximity of a man, or with a means for displaying the state of the information transmission.

What is claimed is:

1. A radio information bulletin board for displaying information simultaneously to a large number of people, the information being changeable in response to radio wave signals, the radio information bulletin board comprising:

information storing means for storing information;

stored information display means for displaying the information stored in said information storing means by reading the information from said information storing means; and stored information transmitting means for reading, when receiving a stored information transmission request from a portable radio information terminal external to said radio information bulletin board, stored information from said information storing means, and for transmitting, by radio wave signals, the stored information read, to the portable radio information terminal originating the transmission request.

2. A radio information bulletin board comprising:

information storing means for storing information and including a plurality of information storage elements corresponding to different radio channels, respectively;

stored information transmitting means for reading, when receiving a stored information transmission request from external radio communications equipment, stored information from said information storing means, and for transmitting, by radio waves, the stored information read, to the external radio communications equipment originating the transmission request; and stored information selecting means for selecting, when the external radio communications equipment transmits a transmission request for stored information in one of said plurality of information storage elements through the channel corresponding to one of said plurality of information storage elements, the information storage element corresponding to the channel associated with the transmission request, from said plurality of the information storage elements, and wherein said stored information transmitting means reads the stored information from the information storage element selected, and transmits the stored information read from the information storage element selected to the external radio communications equipment originating the transmission request.

3. A radio information bulletin board for displaying information, the information being changeable in response to radio wave signals, the radio information bulletin board comprising:

information storing means for storing information;

information receiving means for receiving information transmitted from a portable radio information terminal external to said radio information bulletin board, wherein said information storing means stores the information received from the portable radio information terminal;

stored information transmitting means for reading, when receiving a stored information transmission request from the portable radio information terminal, stored information from said information storing means, and for transmitting, by radio wave signals, the stored information read, to the portable radio information terminal originating the transmission request; and means for tracking information storage capacity of the portable radio information terminal for storing received information and for varying quantity of the information read and transmitted to the portable radio information terminal in accordance with the information storage capacity of the portable radio information terminal.

4. A radio information bulletin board for displaying information, the information being changeable in response to radio wave signals, the radio information bulletin board comprising:

information storing means for storing information;

information receiving means for receiving information transmitted from a portable radio information terminal external to said radio information bulletin board, wherein said information storing means stores the information received from the portable radio information terminal; and stored information transmitting means for reading, when receiving a stored information transmission request from the portable radio information terminal, stored information from said information storing means, and for transmitting, by radio wave signals, the stored information read, to the portable radio information terminal originating the transmission request, wherein the information to be stored is in a format selected from the group consisting of text, hypertext machine language, and JAVA.

5. A radio information bulletin board for displaying information, the information being changeable in response to radio wave signals, the radio information bulletin board comprising:

information storing means for storing information;

information receiving means for receiving information transmitted from a portable radio information terminal external to said radio information bulletin board, wherein said information storing means stores the information received from the portable radio information terminal;

stored information transmitting means for reading, when receiving a stored information transmission request from the portable radio information terminal, stored information from said information storing means, and for transmitting, by radio wave signals, the stored information read, to the portable radio information terminal originating the transmission request; and a controller for controlling said stored information transmitting means and said information receiving means wherein, in response to a command from said controller, said information receiving means enters a state for receiving the radio wave signals for a period of fixed duration.

6. The radio information bulletin board according to claim 1 comprising information receiving means for receiving information transmitted from the portable radio information terminal, wherein said information storing means stores the information received from the portable radio information terminal.

7. A radio information bulletin board according to claim 6 comprising stored information title display means for displaying a list of stored information titles.

* * * * *